United States Patent [19]

Binzen et al.

[11] Patent Number: 4,946,018
[45] Date of Patent: Aug. 7, 1990

[54] EXTENSIBLE AND RETRACTABLE CHUTE

[75] Inventors: Willard Binzen, Mars; Chung C. Lee; David A. Gadsby, both of Coraopolis, all of Pa.

[73] Assignee: Dravo Wellman, Inc., Pittsburgh, Pa.

[21] Appl. No.: 429,076

[22] Filed: Oct. 30, 1989

[51] Int. Cl.5 .............................................. B65G 11/14
[52] U.S. Cl. ................................ 193/25 C; 414/143.1; 193/27; 198/536
[58] Field of Search ............................ 193/3, 25 C, 27; 198/536, 603; 414/143.1

[56] References Cited

U.S. PATENT DOCUMENTS

| | | | |
|---|---|---|---|
| 997,276 | 7/1911 | Curtis | 193/27 |
| 1,539,559 | 5/1925 | Hamachek | 198/536 |
| 1,583,833 | 5/1926 | Howell | 193/27 |
| 1,633,627 | 6/1927 | First | 198/536 |
| 2,502,341 | 3/1950 | Queirolo | 193/27 |
| 2,513,696 | 7/1950 | Veldhuren | 198/603 X |
| 3,696,735 | 10/1972 | Boertte et al. | 193/27 X |
| 3,926,290 | 12/1975 | Isojima et al. | 193/27 |
| 4,161,243 | 7/1979 | Grisnich | 193/27 |
| 4,218,168 | 8/1980 | Parsons | 198/536 X |

Primary Examiner—H. Grant Skaggs
Assistant Examiner—D. Glenn Dayoan
Attorney, Agent, or Firm—Webb, Burden, Ziesenheim & Webb

[57] ABSTRACT

The present invention is directed to a loading chute which includes a hoist frame adapted to be mounted on a conventional loader conveyor above a bulk material hold of a cargo vessel, for example. A plurality of chute segments are provided and are hingeably attached end-to-end in zigzag fashion such that a lower discharge end of a chute segment is attached to an upper receiving end of a subjacent chute segment. Each hinge attachment includes an outwardly extending pivot pin which is attached to a link plate. The link plates between adjacent spaced chutes are joined together by vertically extending semi-rigid support strands which bear the weight of the array of chutes. Hoisting ropes are attached to the lowermost chute segment and are reeled in and out by motor driven hoist reels or drums. Elastic ropes extend laterally from the link plate members at each chute segment hinge to an adjacent support strand. The elastic ropes apply a biasing force to the respective support strands to cause the support strands to be pulled inwardly toward the respective chute hinges to fold into a nested, stowed position when the chute segments are retracted. The support strands are semi-rigid, single braided steel wire strands which preferably include hinged members to permit the folding of the support strands.

16 Claims, 7 Drawing Sheets

EXTENSIBLE AND RETRACTABLE CHUTE

BACKGROUND OF THE INVENTION

The present invention relates generally to gravity chutes for conveying bulk materials. More particularly, the present invention concerns an extensible and retractable chute which is especially suitable for conveying friable, agglomerated or sized particulate materials or dusty materials. Granular bulk materials such as friable coal, sized-coke and dusty ores, cement and grains are usually loaded into holds of cargo ships by automatic-conveyor loaders. The material must be conveyed downwardly into these large cargo holds to a depth of fifty feet, for example. In loading friable or easily breakable bulk materials such as sized stoker coal for power plant boilers, it is not possible to drop the material from great heights since the critical particle sizes will be broken-up by the free-fall impact. Likewise, free-fall delivery of dusty materials into cargo holds also causes severe air pollution and explosion hazards which cannot be tolerated.

Thus, in order to minimize these breakage and dusting problems, it is desirable to convey such bulk materials under controlled flow conditions until the material reaches its destination in the cargo hold. When loading a cargo hold, it is also necessary to periodically raise the bottom end of the conveying device as the level of bulk material increases in the hold so as not to bury the conveying device. A prior telescoping ladder chute which attempts to meet these objectives is disclosed in U.S. Pat. No. 3,926,290 to Isojima et al. which is said to be suitable for ship loading applications. This device has met with limited success. The early patent to Curtis, U.S. Pat. No. 997,276, discloses a zigzag gravity chute which is said to minimize dust and breakage problems when conveying coal, grain and other substances. The chute sections of Curtis are not freely retractable, however, which limits its usefulness in loading cargo holds, for example, where the bulk material gradually fills the space occupied by the conveying chute necessitating the periodic raising of the chute. A further zigzag, stationary loading chute is disclosed in U.S. Pat. No. 2,502,341 to Queirolo. Several prior zigzag-type gravity chutes having retractable chute segments are taught in U.S. Pat. Nos. 4,161,243 and 1,583,833 to Grisnich and Howell, respectively. These prior devices are not suitable for use in conveying bulk cargo over great heights due to their inherent structural shortcomings. In Howell, for example, each chute segment bears the weight of all subjacent chutes which imposes a serious limitation on the overall height of the device.

The present invention solves many of the problems heretofore encountered in loading friable and dusty bulk materials into cargo holds and like storage spaces. The present invention provides a gravity chute conveyor which eliminates breakage and dusting problems and which is relatively light in weight and yet capable of conveying heavy cargo loads over great heights, on the order of fifty feet, for example. The present invention further provides a bulk material conveyor which is quickly and easily extended and retracted from a position above the cargo hold. In the retracted position, the conveyor of the invention assumes a folded or nested configuration of extremely compact dimension which provides for advantageous storage and easy transport from hold to hold. The present invention further provides a bulk conveyor having a novel, weight-supporting segmented suspension system which foldably nests with each of the chute segments as the conveyor is retracted. The instant invention further provides a bulk material conveyor having light weight chute segments with seamless high density plastic liners which greatly increases the life of the chute segments and minimizes maintenance thereof. Because they are open, the chute segments cannot become plugged with material, as common in the prior art, which allows for a more lightweight structural design.

SUMMARY OF THE INVENTION

Briefly stated, the present invention is directed to a loading chute which includes a hoist frame adapted to be mounted on a conventional loader conveyor above a bulk material hold of a cargo vessel, for example. A plurality of chute segments are provided and are hingeably attached end-to-end in zigzag fashion such that a lower discharge end of a chute segment is attached to an upper receiving end of a subjacent chute segment. Each hinge attachment includes an outwardly extending pivot pin which is attached to a link plate. The link plates between adjacent spaced chutes are joined together by vertically extending semi-rigid support strands which bear the weight of the array of chutes. Hoisting ropes are attached to the lowermost chute segment and are reeled in and out by motor driven hoist reels or drums. Elastic ropes extend laterally from the link plate members at each chute segment hinge to an adjacent support strand. The elastic ropes apply a biasing force to the respective support strands to cause the support strands to be pulled inwardly toward the respective chute hinges to fold into a nested, stowed position when the chute segments are retracted. The support strands are semi-rigid, single braided steel wire strands which include hinged link members to permit the folding of the support strands.

BRIEF DESCRIPTION OF THE DRAWINGS

These, as well as other features and advantages of the invention will become apparent when the following detailed description is taken with the drawings, in which.

DETAILED DESCRIPTION OF THE INVENTION

Figure 1:
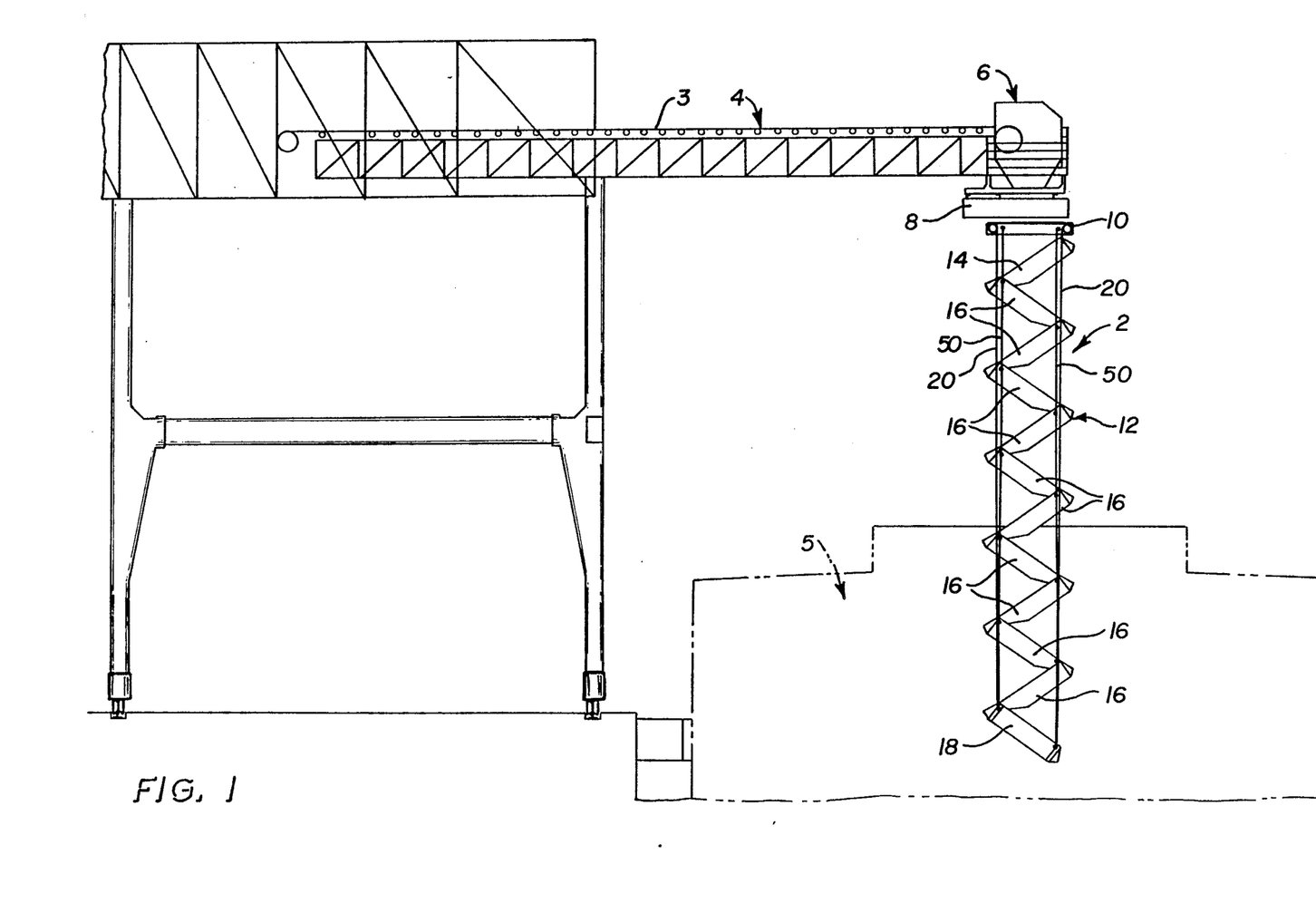
FIG. 1 is a side elevational view of the extensible and retractable chute of the present invention show, in an extended position on a conventional ship loader conveyor.
Figure 2:
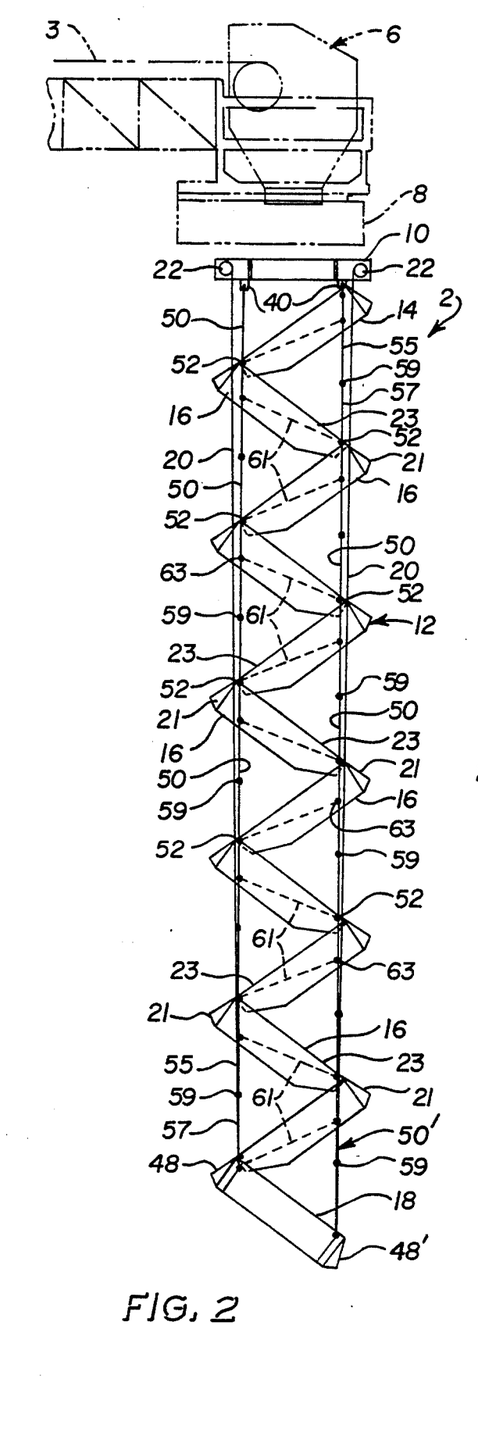
FIG. 2 is a slightly enlarged side elevational view of the chute of FIG. 1.
Figure 3:
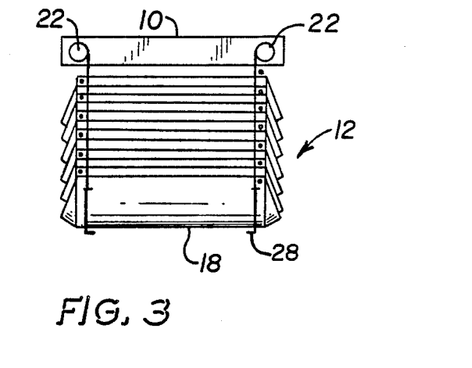
FIG. 3 is a side elevational of the chute of FIG. 2 in a fully retracted position.

Referring now to the drawings, and particularly to FIGS. 1 through 4, the extensible and retractable chute of the present invention, generally designated 2, is shown in conjunction with a convention ship loading apparatus 4. The ship loader 4 includes a discharge chute mechanism 6 of known design and has a loader boom which shuttles to move the chute mechanism 6 to a desired position directly above the open hold 5 of a cargo vessel. The conventional discharge chute mechanism 6 includes a telescoping chute frame 8 from which the commonly used telescoping ladder chute and dust containment enclosure of the prior art are attached (not shown). The conveyor chute 2 of the present invention includes a hoist drive frame 10 which is attached to the conventional chute frame 8. Conveyor chute 2 comprises a plurality of chute segments generally designated 12 which depend downwardly from the hoist frame 10 in a zigzag array when in an open or extended position as shown in FIGS. 1 and 2. The array of chute segments 12 comprises an uppermost chute segment 14, a lowermost chute segment 18, and a plurality of intermediate chute segments 16 positioned therebetween. The chute segments 12 are lowered and retracted by hoisting ropes or cables 20. The conveyor chute 2 can be lowered as shown in FIGS. 1 and 2 to extend downwardly from the ship loader 4 into the interior of the ship's hold 5 a distance typically on the order of 50 feet or more. Hoisting ropes 20 are wound around motorized hoist reels or drums 22 carried by the hoist drive frame 10.

Figure 4:
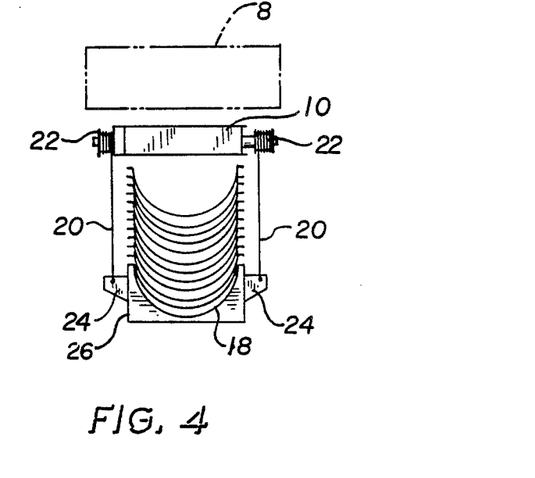
FIG. 4 is a front elevational view of the retracted chute of FIG. 3.
Figure 5:
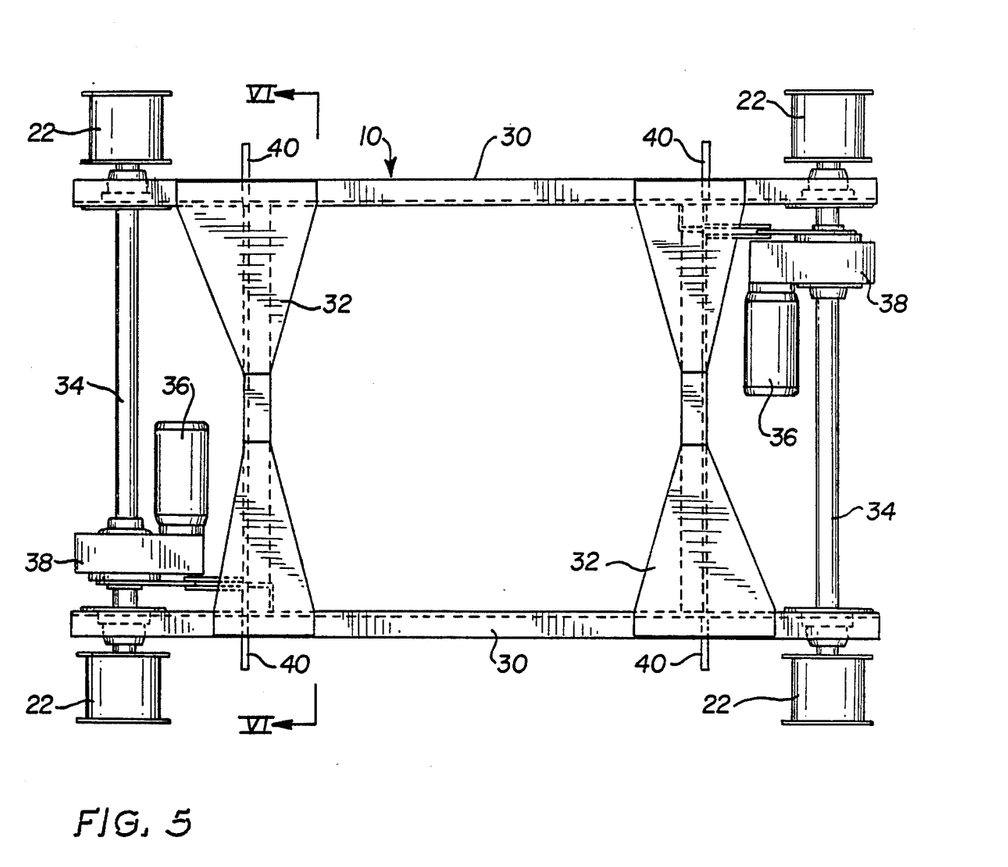
FIG. 5 is a top plan view of a hoist frame and drive arrangement of the invention.

As seen in FIG. 5, hoist frame 10 carries four motor drive drums 22 which reel in four hoisting ropes 20 when the chute 2 is to be retracted, as will be explained in greater detail hereinafter. The lower ends of the hoisting ropes 20 are secured to the lowermost chute segment 18. In the fully retracted position shown in FIGS. 3 and 4, the conveyor chute 2 assumes a nested configuration of very compact dimensions, for example on the order of about 6 feet in height, as measured from the bottom of the hoist drive frame 10 to the bottom of the lowermost chute 18 for a typical twelve chute segment array, as shown in FIGS. 1 through 4 of the drawings.

Figure 10:
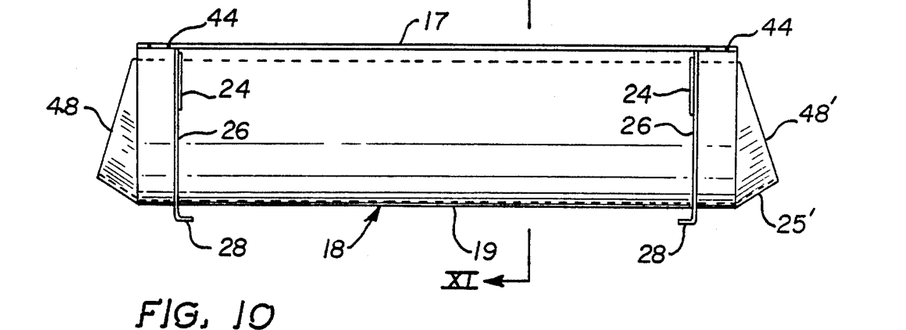
FIG. 10 is a side elevational view of a lowermost chute segment of the present invention.
Figures 11, 13, 13A:
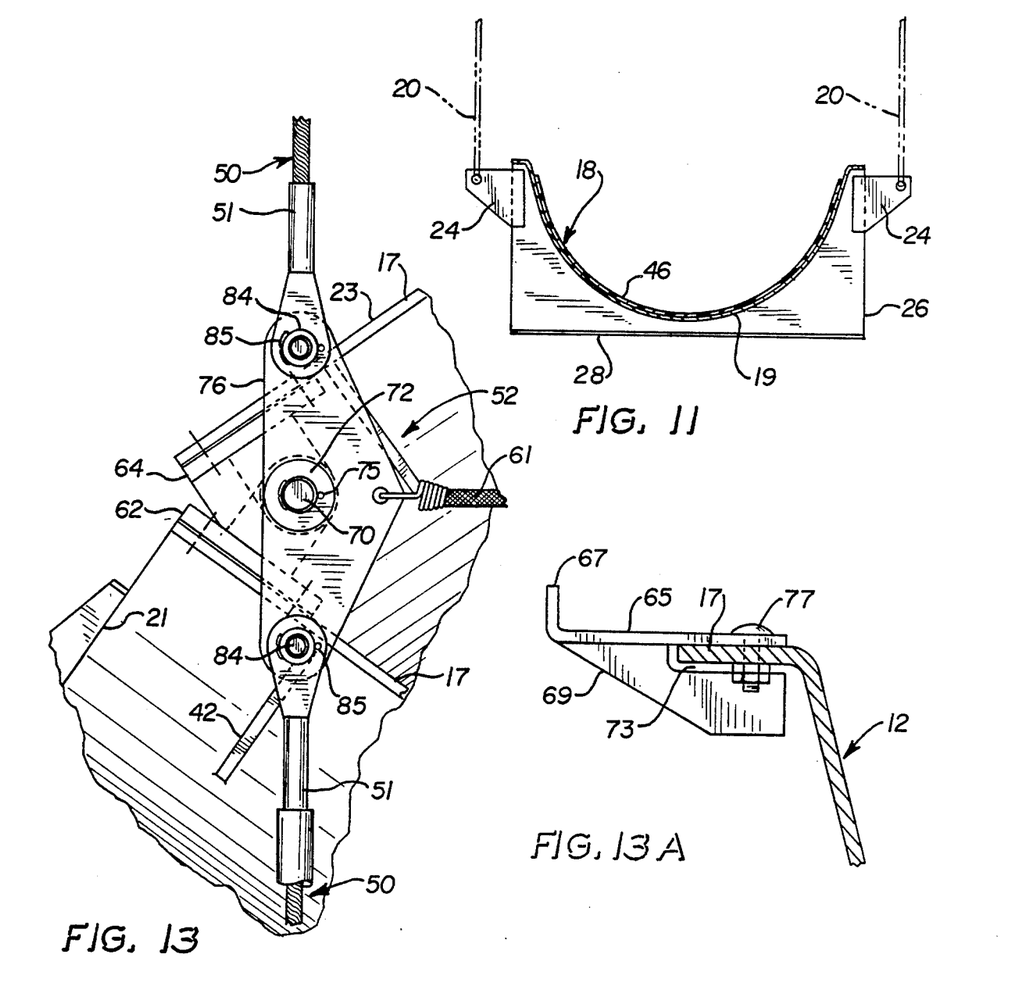
FIG. 11 is a sectional view of the lowermost chute segment taken along line XI—XI of FIG. 10.
FIG. 13 is a partially fragmented side elevational view of a typical hinge arrangement connecting adjacent chute segments.
FIG. 13a is a partially fragmented sectional view of an outrigger bracket taken along line XIIIa—XIIIa of FIG. 12.

As perhaps best seen in FIGS. 4, 10 and 11, the lowermost chute segment 18 carries four outwardly extending plates 24 secured on opposed sides at each end portion thereof which have apertures therein to permit attachment of the lifting ropes 20 thereto. The lifting plates 24 are carried by a pair of support webs 26 which are secured to the lowermost chute segment 18. The webs 26 form a support base and carry right angularly bent feet 28 to permit the nested array of chute segments 12 to be placed on a flat surface for storage in an upright position.

Figure 6:
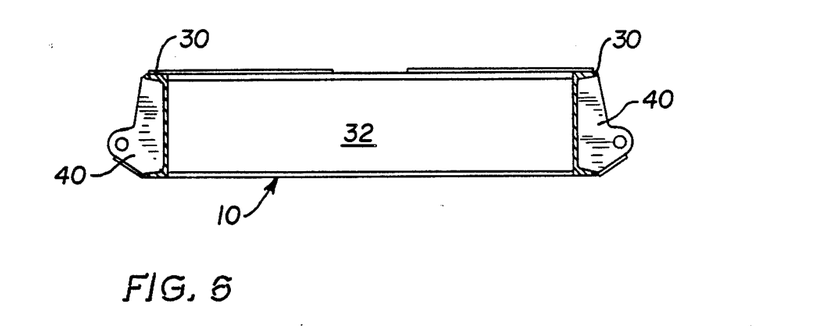
FIG. 6 is a cross-sectional view of the hoist frame taken along line VI—VI of FIG. 5.

Referring to FIGS. 5 and 6, the hoist drive frame 10 is fabricated from a pair of spaced-apart steel structural members 30 which are rigidly joined together by a pair of spaced-apart transverse structural members 32. The hoisting drums 22 are turned by drive shafts 34 which are journaled for rotation within the structural members 30 and driven by electric motors 36 which include conventional gear motor reducers 38. Each of the structural members 30 also carry a pair of outwardly extending apertured flanges 40, the function of which will be explained in more detail hereinafter.

Figure 7:
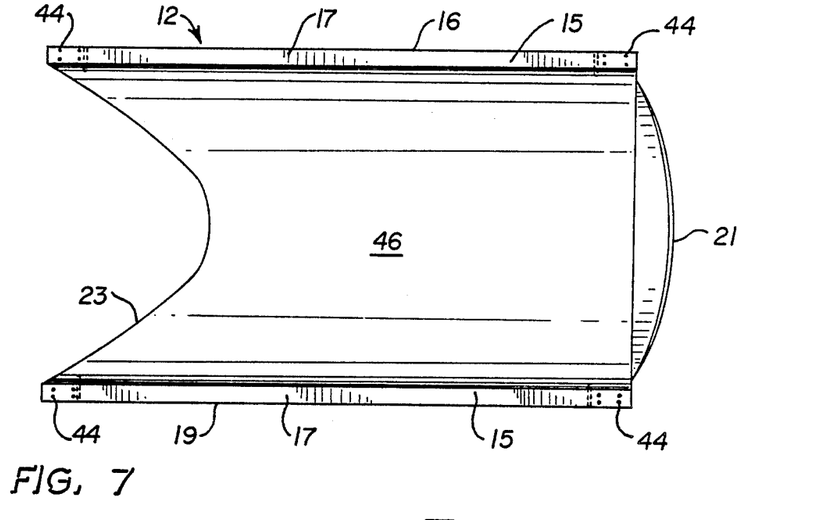
FIG. 7 is a plan view of an intermediate chute segment of the present invention.
Figure 8:
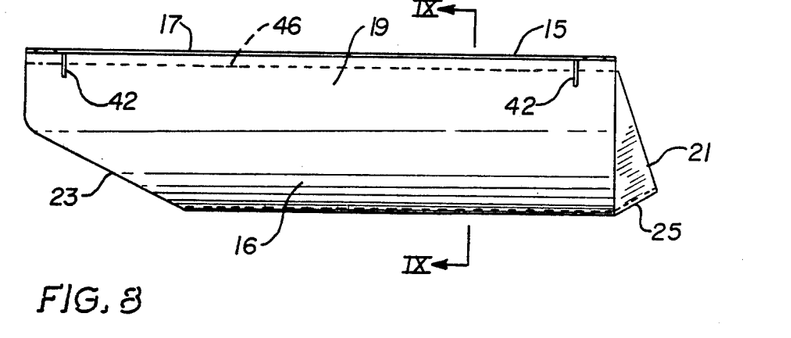
FIG. 8 is a side elevational view of the chute segment of FIG. 7.
Figure 9:
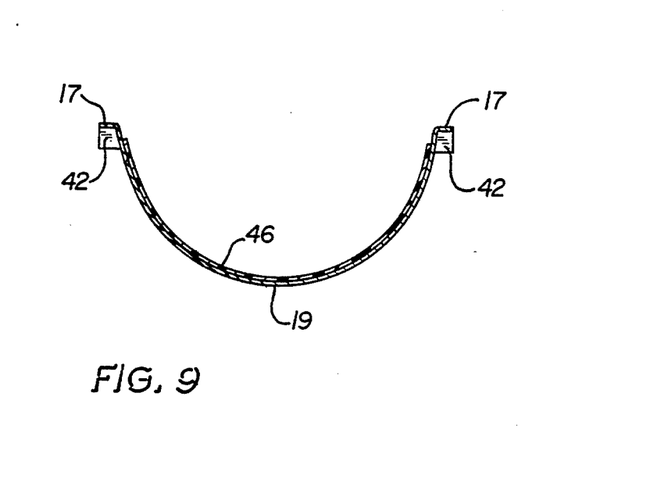
FIG. 9 is a sectional view of the chute segment taken along line IX—IX of FIG. 8.

The details of construction of the chute segments 12 will now be explained with reference to FIGS. 7 through 11. FIGS. 7, 8 and 9 depict a presently preferred configuration of a conveyor chute segment 12 which is suitable for use as the uppermost chute 14 as well as the intermediate chutes 16. The chute segment depicted in FIGS. 10 and 11 is a presently preferred embodiment of the lowermost chute segment 18. For ease of description, the chute segment depicted in FIGS. 7 through 9 will be identified by reference numeral 16, which refers to an intermediate chute segment; however, it is understood that the configuration of the uppermost chute segment 14 is identical therewith. The chute segment 16 has opposed, parallel extending, upper edge portions 15 which are formed in the shape of outwardly extending flanges 17. The chute body 19 has a generally concave-shaped inner surface which extends between the lateral edges 15 of the chute segment. The chute segment further comprises a first or upper end 21 which has an outwardly bowed configuration adapted to receive material from a superjacent chute or from the discharge chute 6 if the segment is the uppermost chute 14. A second or lower end 23 of the chute segment 16 serves to discharge the conveyed particulate material to the upper end 21 of a subjacent chute 16. As seen in FIG. 8, the first or upper end of the chute segment carries an upwardly formed lip portion 25 which serves to contain dumped particulate material within the chute segment. The rear edge of the concave body 19 at the lower end 23 of the chute segment is formed in an inwardly curved manner to contain the particulate material and to discharge the material to a subjacent chute. The chute segments 16 also preferably contain stiffening webs 42 weldably secured between the outwardly extending flanges 17 and the side of the chute body 19 to lend rigidity to the flanges 17. The flanges 17 have four sets of holes 44 formed at each corner thereof which are adapted to receive mounting bolts therethrough for the securement of hinge members, as will be explained in greater detail below.

The chute body 19 of segment 12 is preferably constructed of an aluminum alloy material so as to obtain structural strength while providing a lightweight construction. In order to protect the relatively soft aluminum material of body 19 from abrasive wear caused by the sliding conveyed solids, a liner insert 46 is preferably applied to the interior concave surface of each of the aluminum chute bodies 19, FIGS. 8 and 9. The liner insert 46 is preferably constructed of an ultra-high molecular weight plastic. The aluminum chute body 19 may be constructed of an aluminum alloy type 5083-0, for example, having a typical thickness of about $\frac{1}{4}$ inch and an overall length of about 7 feet. The liner 46 is applied to each chute segment in one piece and without seams along the surface of the chute body 19. The liner 46 is attached to the body 19 by conventional bolts or the like (not shown) in a known manner. In this way, abrasive wear due to the sliding action of the bulk material occurs only to the liner 46. The liner 46 is periodically replaced as needed, preserving the integrity of the more expensive fabricated metal chute bodies 19.

As seen in FIG. 10, the lowermost chute segment 18 has end portions 48 and 48' which are both fabricated in an outwardly directed configuration, identical to the previously described first end 21 of FIGS. 7 and 8. The second 48' of chute segment 18 is formed with an upwardly-sloped, lower lip portion 25, similar to previously described lip 25 of FIG. 8 in order to provide improved material distribution within the ship's hold, or like storage containment area when the conveyor chute 2 is in a fully extended position such as in FIGS. 1 and 2 wherein second end 48' assumes the lowermost position.

Figure 12:
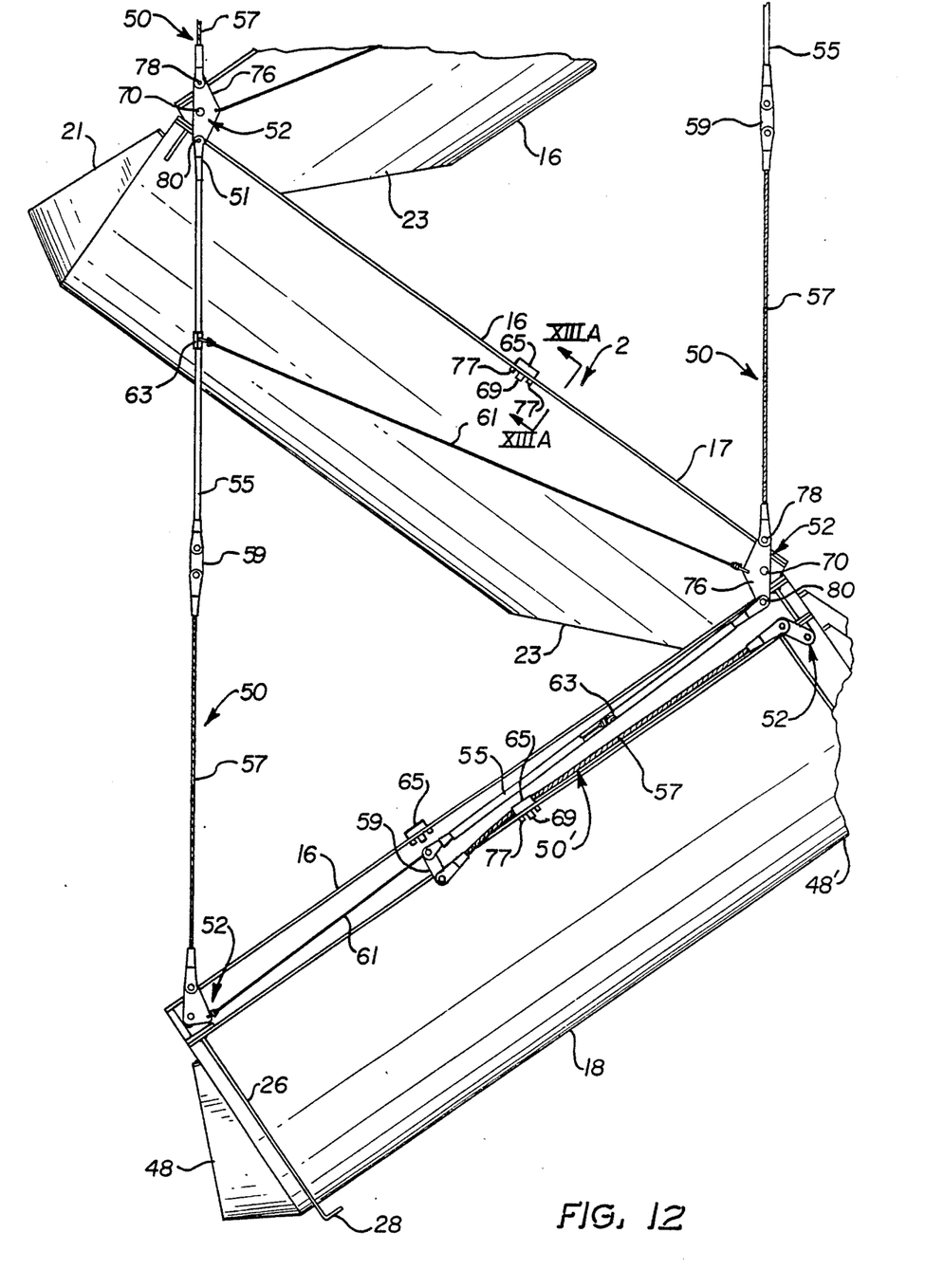
FIG. 12 is an enlarged, partially fragmented, side elevational view of the lower four conveyor segments showing the lower two segments in a retracted or nested position.
Figure 14:
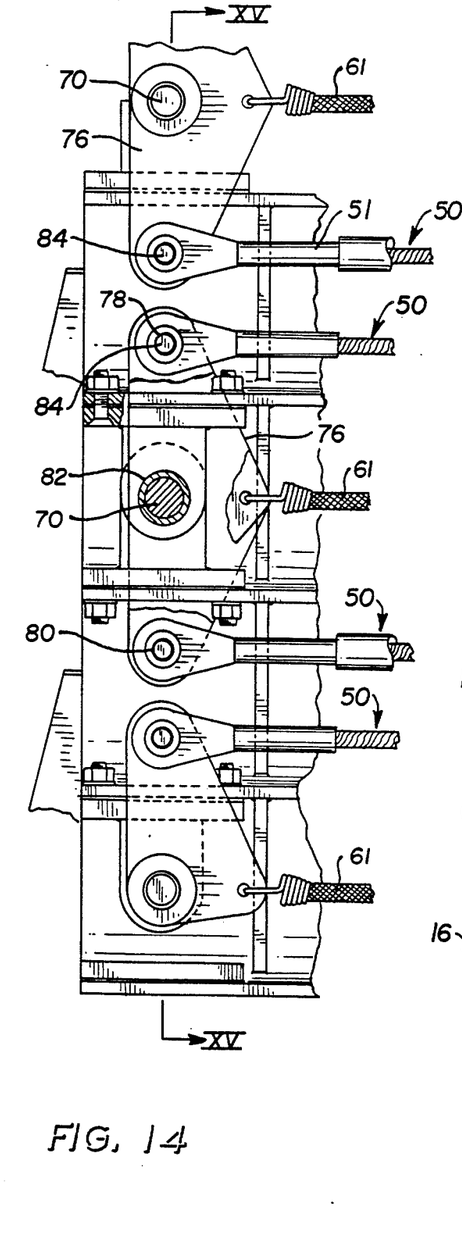
FIG. 14 is a partially fragmented side elevational view of the hinges on the lower four chute segments when the chute segments are in a retracted or nested position.
Figure 15:
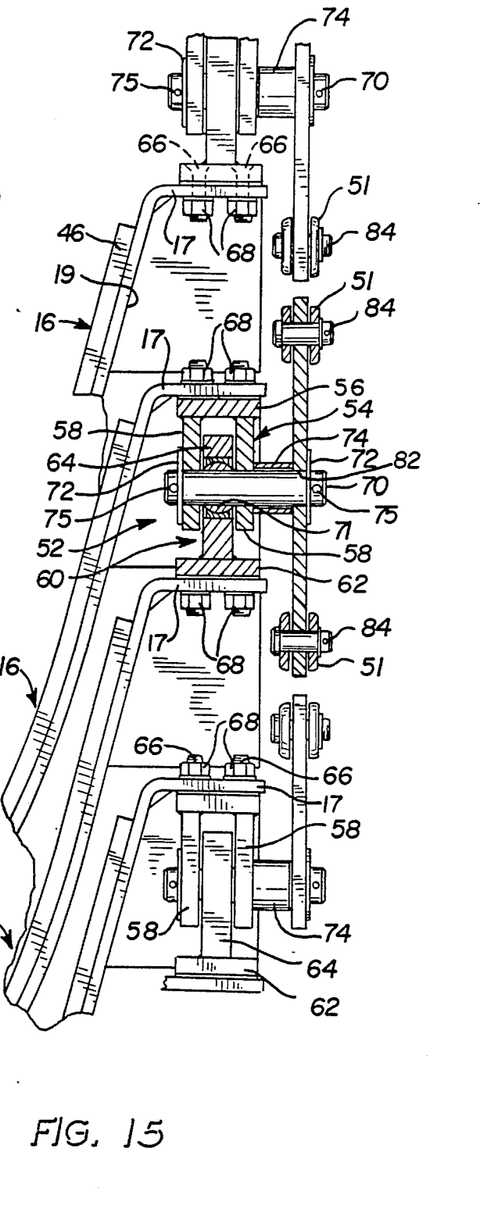
FIG. 15 is a partial sectional end view of the hinges and chutes taken along line XV—XV of FIG. 14.

The chute segments 12 are each supported by four semi-rigid support strands, generally designated by reference numeral 50. The semi-rigid support strands 50 are each preferably formed by single-steel wire braided members which are pivotally secured to adjacent chute segments 12 by clevis members 51 attached to hinged members 52 located at each side of the chute segments, at the ends 21 and 23 thereof. Thus, each of the intermediate chute segments 16 has four hinge members 52 attached thereto within the previously mentioned bolt hole locations 44 depicted in FIG. 7. The structure of the hinge members 52 is more clearly shown in FIG. 15. Each hinge member is made up of a pivot pin bracket 54 which comprises a base plate portion 56 having outwardly extending apertured spaced webs 58 joined thereto. A bearing housing 60 comprising a base plate 62 having an apertured web 64 matingly fits between the spaced webs 58 of the pivot bracket 54. The pivot pin bracket 54 and the bearing housing 60 are secured to respective flanges 17 of adjacent chute segments 16 by way of four countersunk bolts 66 which pass through the aforementioned bolt holes 44 in the flange 17 and are secured thereto by nuts 68. A bearing member 71 is positioned within the aperture of web 64 and rotatably receives a pivot pin 70 therein. A hanger link 76 is fitted over the pivot pin 70 and spaced from the pivot pin bracket 54 by way of a spacer sleeve 74 fitted around the pivot pin 70. Washer members 72 are positioned at the opposed ends of the pivot pin 70 and cotter pins 75 pass through appropriate holes formed in the ends of the pivot pin to secure the assembly. As seen in FIGS. 13 through 15, the hanger link 76 has a generally triangular shape for those hinged joints intermediate the uppermost and lowermost chute segments 14 and 18, respectively. Hanger link 76 has upper and lower holes 78 and 80, respectively and a central hole 82 formed therein to closely receive the end of pivot pin 70 therethrough. The origins of the holes 78, 80 and 82 are aligned along a common axis which coincides with a common vertical axis of the semi-rigid support strands 50 when the chutes are in an extended position as shown in FIG. 12. The semi-rigid support strands 50 are aligned with each of the respective pivot pins 70 in true vertical alignment so that the bearing weight of the assembly passes through the strands 50 and is not transferred to the individual chute segments.

As previously stated, the support strands 50 are constructed of a semi-rigid single braided strand of steel wire. Such strands offer superior load bearing capabilities in tension and assume a straight vertical orientation which is desirable when the chute is in the extended position for proper operation and alignment. In order to accommodate the semi-rigid support strands 50 when the chute segments 12 are retracted, the support strands 50 are each constructed in two segments and hingeably joined together to allow for folding of the segment 50 when the chutes are retracted. With reference to FIGS. 2 and 12, it will be appreciated that each of the semi-rigid support strands 50 comprise an upper strand segment 55 and a lower strand segment 57 hingeably joined together by a link member 59. An elastic rope 61, of the type commonly referred to as a "bungee cord" is attached to each of the upper strand segments 55 at one end and to the hanger link 76 of an oppositely disposed hinge member 52 at the other end, FIG. 12. The elastic rope 61 applies a biasing force to the upper segment 55 of the semi-rigid support strand 50 and pulls the strand 50 toward the respective hinge member 52 as the chute segments are foldably retracted. As the chute segments move together, the link member 59 permits the strand segments 55 and 57 to assume an overlapped, folded position as shown at 50' in FIG. 12. The elastic rope 61 is attached to the strand segment 55 by way of a hook and vertically adjustable tube clamp 63 which is located approximately mid-way between the ends of upper strand segment 55. With reference to FIGS. 12 and 13a, an outrigger bracket 65 is carried by each of the flanges 17 of the chute segments 12 to provide a seat for the folded support strands 50. The bracket 65 has an upright edge 67 and a web 69 and is attached to the flange 17 by way of a pair of threaded fasteners 77. The web 69 has a cut-out area 73 to permit placement of the bracket 65 over the flange 17.

As seen in FIGS. 2 and 12, when the extensible and retractable chute conveyor of the present invention is to be retracted, the motorized hoist reels 22 on the right hand side of the hoist frame 10 are activated to cause the hoisting ropes 20 attached to lower end 48' of the lowermost chute segment 18 to rise to a position shown in FIG. 12 where it is nested with the next adjacent chute 16 thereabove. At this position, the conveyor 2 is fully capable of delivering the particulate material to the storage hold 5 at a slightly higher elevation. In this slightly raised position, the bulk material is discharged from end 48 of the lowermost chute segment 18. In order to further retract the chute segments, the hoisting ropes 20 on the left hand set of motorized hoist reels 22 are raised, causing the lower two nested chutes shown in FIG. 12 to nest with the next superjacent chute 16. As the vertical array of chute segments 12 are retracted and nested, the semi-rigid support strands 50 are compactly folded and stowed by virtue of the elastic ropes 61 and hinged link members 59. Outrigger brackets 65 provide seating surfaces for the folded support strands to insure proper stowage thereof and prevent kinking damage to the braided wire strands. As shown in FIG. 12, the upper strand segment 55 preferably includes a plastic pipe or jacket therearound to permit vertical slideable adjustment of the clamp 63 along the strand segment 55. Proper tensioning of the elastic rope 61 is achieved by vertical adjustment of the clamp 63 so that the desired level of tension is in the rope 61 both in the extended and retracted positions. It is important that not too much tension is applied by rope 61 when the chutes are in the extended position. If this occurs, the support segment 50 may be pulled or bowed inwardly, away from the desired vertical orientation, which will cause an undesirable lateral shifting of the entire array of chutes. Thus, the elastic ropes 61 are adjustably positioned by way of clamps 63 to prevent such unwanted bowing conditions.

As shown in FIGS. 2, 5 and 6, the lower or left-hand side of the uppermost chute segment 14 is attached to the apertured flanges 40 carried by the hoist drive frame 10, by way of semi-rigid support strands, similar, but shorter than strands 50. The upper or right-hand side of the uppermost chute segment 14 is directly hinged to the hoist drive frame 10 using hinge brackets similar to the brackets 54 and 60 previously described in connection with the hinge member 52 of FIG. 15. The support strands 50 from the chute segment 16 directly beneath uppermost chute segment 14 are attached to the right hand flanges 40 of the hoist drive frame 10. In this manner, the bearing weight carried by the four vertically aligned sets of semi-rigid support strands 50 is assumed by the flanges 40 of the hoist drive frame 10. The cumulative weight of subsequent zigzag chutes 12 are not borne by superjacent chutes as is common in prior art constructions of the zigzag type. Since the weight of the subjacent chutes is not carried by the chutes themselves, it is possible to construct the chute segments of the present invention from a light-weight lower tensile strength materials. Thus, the hoisting motors and frame 10 and hoisting ropes, likewise, carry lighter loads than heretofore experienced in prior art chute constructions. In the example shown in the drawings, twelve chute segments are depicted which individually have a length of approximately 6 and ½ feet with a typical angular relationship of about 35° to the horizontal when in an open extended position. Such an array of chutes 12 is extended to achieve an extended depth of about 50 feet. Of course, it is understood that more or less chute segments 12 can be employed to achieve conveying elevations of desired dimensions.

The hoist drive frame 10 is connected in a conventional manner to the discharge chute frame 8 of the ship loader 4 and discharge chute mechanism 6. The conveyor 2 of the invention is capable of rotative movement about a vertical axis extending through the discharge chute frame which adds additional versatility in ship loading operations. Such rotative movement is possible due to the fact that the conventional discharge chute frame 8 carries a rotatable mounting structure (not shown). It can be further appreciated that the conveyor 2 of the present invention is relatively light in weight due to the aluminum and plastic construction of the discharge chute segments 12; yet such construction is capable of handling high bulk material tonnage due to the semi-rigid support strands 50 and hinge members 52 which bear the weight carried by the chute segments.

While I have shown and described a present preferred embodiment of the invention, it is to be distinctly understood that the invention is not limited thereto but may be otherwise variously embodied within the scope of the following claims.

What is claimed is:

1. An extensible and retractable bulk material chute comprising:
   a. a hoist frame having rotatable hoist drum means associated therewith and including means for rotating said hoist drum means;
   b. a plurality of elongated chute segments positioned beneath the hoist frame, each chute segment having a material conveying surface and opposed first upper end and a second lower end, said chutes positioned in a vertical array;
   c. hinge means for pivotally joining said chute segments at respective adjacent first and second ends, whereby the lower end of a chute segment is pivotally joined to an upper end of a subjacent chute segment;
   d. pivot pin means extending outwardly on each of said hinge means;
   e. support strand means attached to each of said pivot pin means and extending between the upper end of a chute segment and the lower end of a subjacent chute segment, and including hinge means for attaching an upper end of an uppermost chute segment to the hoist frame and support strand means for attaching the pivot pin means carried on a lower end of the uppermost chute segment to the hoist frame, whereby a weight of said chute segments is carried by said support strand means; and
   f. hoist rope means attached at an upper end to said hoist drum means and to a lowermost chute segment at a lower end thereof to selectively extend and retract said loading chute, whereby said chute segments foldably nest and un-nest one upon the other as said chute segments pivot about said hinge means when said hoist rope means is raised and lowered, respectively.

2. The extensible and retractable chute of claim 1 including elastic rope means attached at a first end to said support strand means positioned between two adjacent chute segments and at a second end to the hinge means joining said adjacent chute segments, whereby when said chute segments are raised to a retracted position said elastic rope means applies a biasing force to said attached support strand means causing said support strand means to move to a stowed position adjacent said nested chute segments.

3. The extensible and retractable chute of claim 2 wherein the support strand means includes link means positioned between each of said adjacent chute segments to permit said support strand means to pivotally fold when said chute segments move to the retracted, nested position.

4. The extensible and retractable chute of claim 3 including means to permit selective vertical positioning of said elastic rope along the support strand whereby a predetermined biasing force is attained in said elastic rope 5. The extensible and retractable chute of claim 4 wherein the means for selectively adjusting the location of the elastic rope comprises a plastic tube enclosing a length of said support strand means located above said link means and a tube clamp means attached to said elastic rope and slidably moveable along said plastic tube to permit selective vertical positioning of the first end of said elastic rope therealong.

6. The extensible and retractable chute of claim 1 wherein each of said chute segments are constructed of a metal material having an inner liner surface of a polymeric material.

7. The extensible and retractable chute of claim 1 wherein the chute segments are constructed of an aluminum alloy material having an inner liner surface of an ultra high density engineering plastic material.

8. The extensible and retractable chute of claim 7 wherein the support strand means is constructed of a braided steel wire material.

9. The extensible and retractable chute of claim 1 wherein the plurality of chute segments includes an uppermost chute segment hingeably attached at its first upper end to said hoist frame and wherein support strand means includes an upper segment extending downwardly from said hoist frame and attached to the hinge means located at the second lower end of said uppermost chute segment and attached to the hinge means located at the second end of a next subjacent chute segment, said support strand means successively attached to the hinge means carried by a descending array of chute segments, at respective opposed ends thereof, whereby said support strand means assumes a vertical orientation having longitudinal axes passing through said pivot pin means when said chute segments are in an extended position.

10. The extensible and retractable chute of claim 9 wherein the support strand means comprises four vertically extending sets of support strand members each set attached at a corner of the array of chute segments.

11. An extensible and retractable bulk material chute comprising:
   a. a hoist frame having rotatable hoist drum means associated therewith including means for rotating said hoist drum means;
   b. a plurality of elongated chute segments positioned beneath the hoist frame, each chute segment having a material conveying surface and opposed first upper end and a second lower end, said chutes positioned in a vertical array;
   c. hinge means for pivotally joining said chute segments at respective adjacent first and second ends, whereby the lower end of a chute segment is pivotally joined to an upper end of a subjacent chute segment;
   d. pivot pin means extending outwardly on each of said hinge means;
   e. support strand means attached to each of said pivot pin means and extending between the upper end of a chute segment and the lower end of a subjacent chute segment whereby a weight of said chute segments is carried by said support strands;
   f. hoist rope means attached at an upper end to said hoist drum means and to a lowermost chute segment at a lower end thereof to selectively extend and retract said loading chute, whereby said chute segments foldably nest and open as said chute segments pivot about said hinge means when said hoist rope means is raised and lowered, respectively;
   g. link means associated with said support strand means and positioned between adjacent chute segments to permit said support strand segments to fold together when moved toward an adjacent hinge means, and
   h. elastic rope means attached at a front end to said support strand means between two adjacent chute segments and at a second end to the hinge means joining said adjacent chute segments, whereby when said chute segments nest in a retracted position said elastic rope means applies a biasing force to said support strand means causing said support strand means to fold at said link means and to move to a stowed position adjacent said nested chute segments.

12. The extensible and retractable chute of claim 11 including means to permit selective vertical positioning of said elastic rope along the support strand whereby a predetermined biasing force is attained in said elastic rope.

13. The extensible and retractable chute of claim 12 wherein the means for selectively adjusting the location of the elastic rope comprises a plastic tube enclosing a length of said support strand means located above said link means and a tube clamp means attached to said elastic rope and slidably moveable along said plastic tube to permit selective vertical positioning of the front end of said elastic rope therealong.

14. The extensible and retractable chute of claim 11 wherein the chute segments are constructed of an aluminum alloy material having an inner liner surface of an ultra high density engineering plastic material.

15. The extensible and retractable chute of claim 14 wherein the support strand means is constructed of a braided steel wire material.

16. The extensible and retractable chute of claim 11 including outrigger bracket means carried by said chute segments, outwardly extending from a side edge portion of said chute segments to receive and hold said support strand means therein when the strand means is folded in the stowed position.

* * * * *

UNITED STATES PATENT AND TRADEMARK OFFICE
CERTIFICATE OF CORRECTION

PATENT NO.  : 4,946,018
DATED       : August 7, 1990
INVENTOR(S) : Willard Binzen, Chung C. Lee and David A. Gadsby

It is certified that error appears in the above-identified patent and that said Letters Patent is hereby corrected as shown below:

Column 2 Line 46 "show," should read --shown--.

Column 2 Line 51 after "elevational" insert --view--.

Column 4 Line 13 "carry" should read --carries--.

Column 5 Line 14 "25," should read --25'--.

Column 7 Line 21 "are" should read --is--.

Column 7 Line 26 "a light-weight" should read --lightweight--.

Claim 6 Line 59 Column 8 "are" should read --is--.

Signed and Sealed this

Tenth Day of December, 1991

*Attest:*

HARRY F. MANBECK, JR.

*Attesting Officer*    *Commissioner of Patents and Trademarks*